United States Patent
Gunnam

(10) Patent No.: US 8,627,131 B2
(45) Date of Patent: Jan. 7, 2014

(54) HARDWARE COUNTERMEASURE AGAINST CRYPTOGRAPHIC ATTACK

(75) Inventor: Kiran Kumar Gunnam, San Jose, CA (US)

(73) Assignee: Certicom Corp., Mississauga (CA)

( * ) Notice: Subject to any disclaimer, the term of this patent is extended or adjusted under 35 U.S.C. 154(b) by 138 days.

(21) Appl. No.: 13/283,472

(22) Filed: Oct. 27, 2011

(65) Prior Publication Data

US 2013/0111204 A1  May 2, 2013

(51) Int. Cl.
*G06F 21/00* (2013.01)

(52) U.S. Cl.
USPC .......................................... 713/330; 713/150

(58) Field of Classification Search
USPC .................................................. 713/150, 330
See application file for complete search history.

(56) References Cited

U.S. PATENT DOCUMENTS

| | | | |
|---|---|---|---|
| 6,748,410 B1 * | 6/2004 | Gressel et al. | 708/491 |
| 2012/0124669 A1 * | 5/2012 | Carpenter et al. | 726/25 |

FOREIGN PATENT DOCUMENTS

| | | |
|---|---|---|
| EP | 1571529 A2 | 9/2005 |
| FR | 2863746 A1 | 6/2005 |
| WO | 9963696 A1 | 12/1999 |
| WO | 03025715 A1 | 3/2003 |

OTHER PUBLICATIONS

Pramstaller, Norbert, et al. "Towards an AES crypto-chip resistant to differential power analysis." Solid-State Circuits Conference, 2004. ESSCIRC 2004. Proceeding of the 30th European. IEEE, 2004.*
Extended European Search Report mailed Jan. 18, 2013, in corresponding European patent application No. 12152533.1.
Najeh, Kamoun et al.; "Correlated power noise generator as a low cost DPA countermeasures to secure hardware AES cipher", Signals, Circuits and Systems (SCS), 2009 3rd International Conference on, IEEE, Piscataway, NJ, USA, Nov. 6, 2009, pp. 1-6, XP031627510, DOI: 10.1109/ICSCS.2009.5413884 ISBN:978-1-4244-4397-0.
Jean-Jacques Quisquater et al.; "ElectroMagnetic Analysis (EMA): Measures and Counter-measures for Smart Cards", In: "Smart Card programming and Security", Jan. 1, 2001, Springer Berlin Heidelberg, Berlin, Heidelberg, XP055031642, ISBN: 978-3-54-042610-3 vol. 2140, pp. 200-210, DOI: 10.1007/3-540-45418-7-17.

* cited by examiner

*Primary Examiner* — Kambiz Zand
*Assistant Examiner* — Michael Guirguis
(74) *Attorney, Agent, or Firm* — Novak Druce Connolly Bove + Quigg LLP

(57) ABSTRACT

A hardware countermeasure for a cryptographic hardware module of a computing device is provided. The hardware countermeasure may include a noise-sample generator and a distributed buffer network co-located with the cryptographic module. The noise-sample generator may take as input data samples to be processed by the cryptographic hardware module and generate as output a non-Gaussian noise-sample for each of the input data samples. The distributed buffer network may take as input the non-Gaussian noise-samples and generate a non-Gaussian noise output corresponding to each of the non-Gaussian noise-samples.

12 Claims, 10 Drawing Sheets

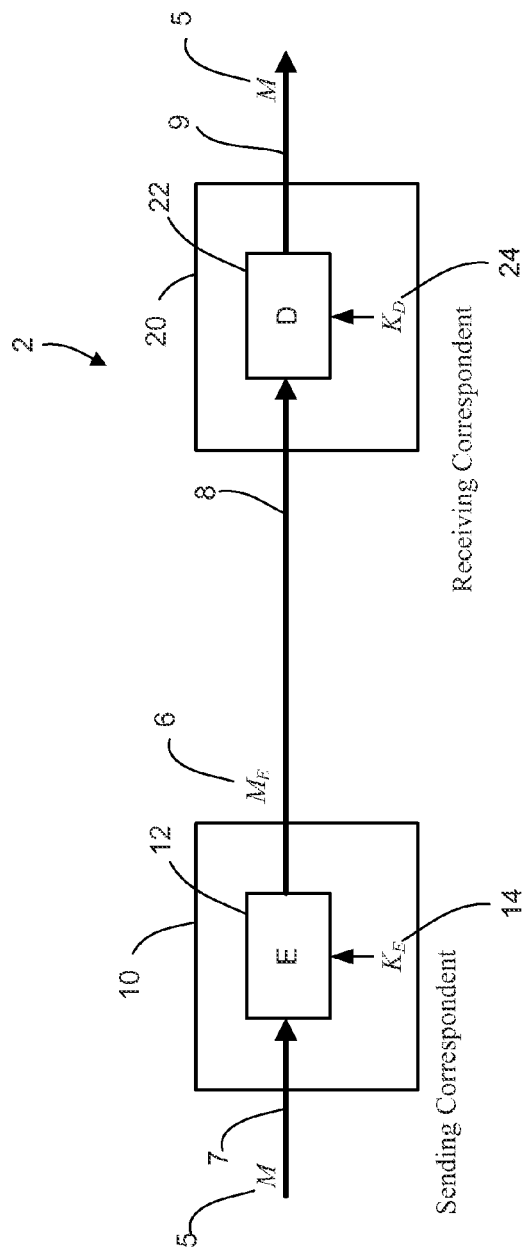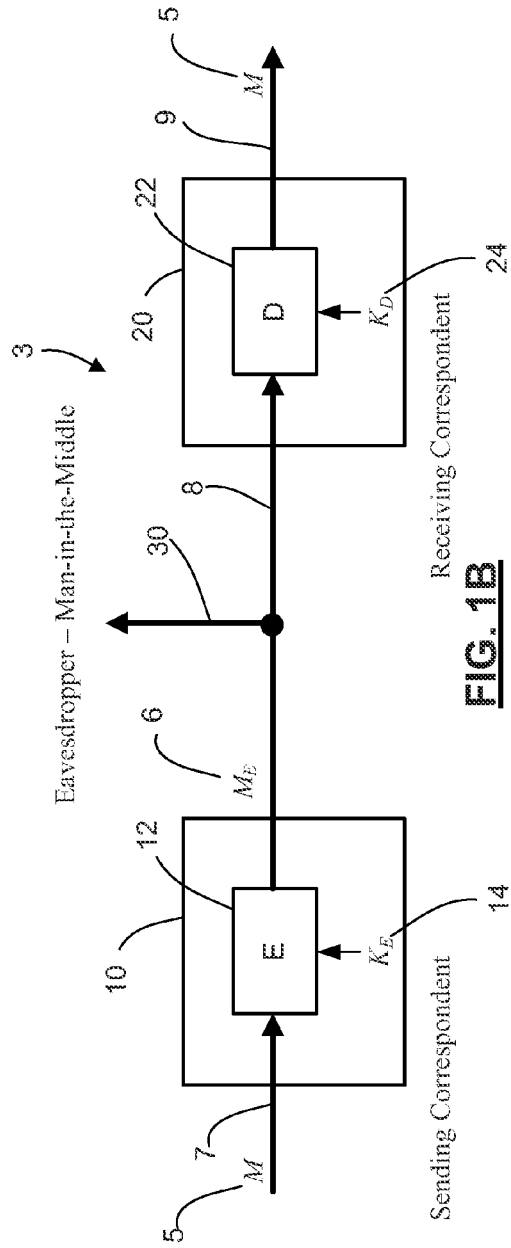

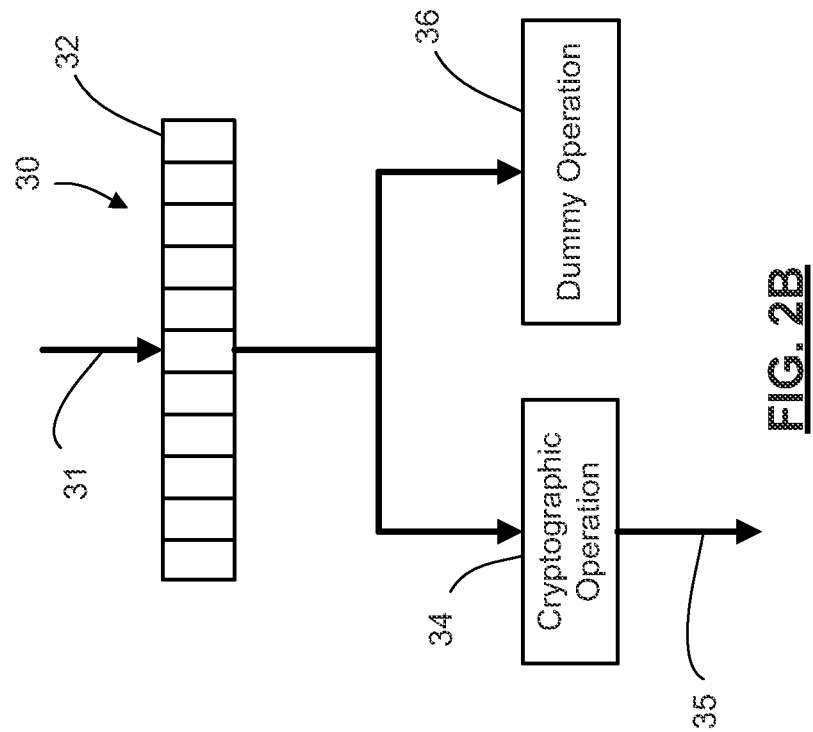
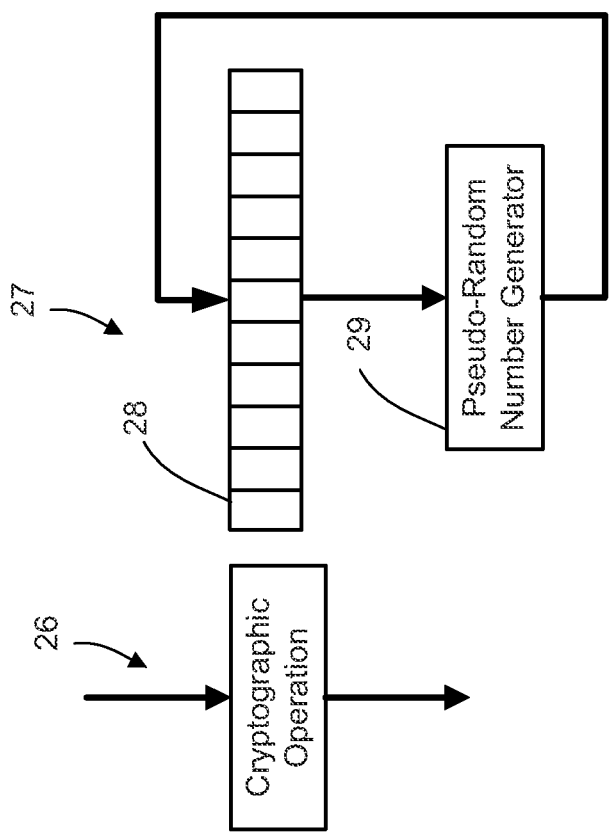

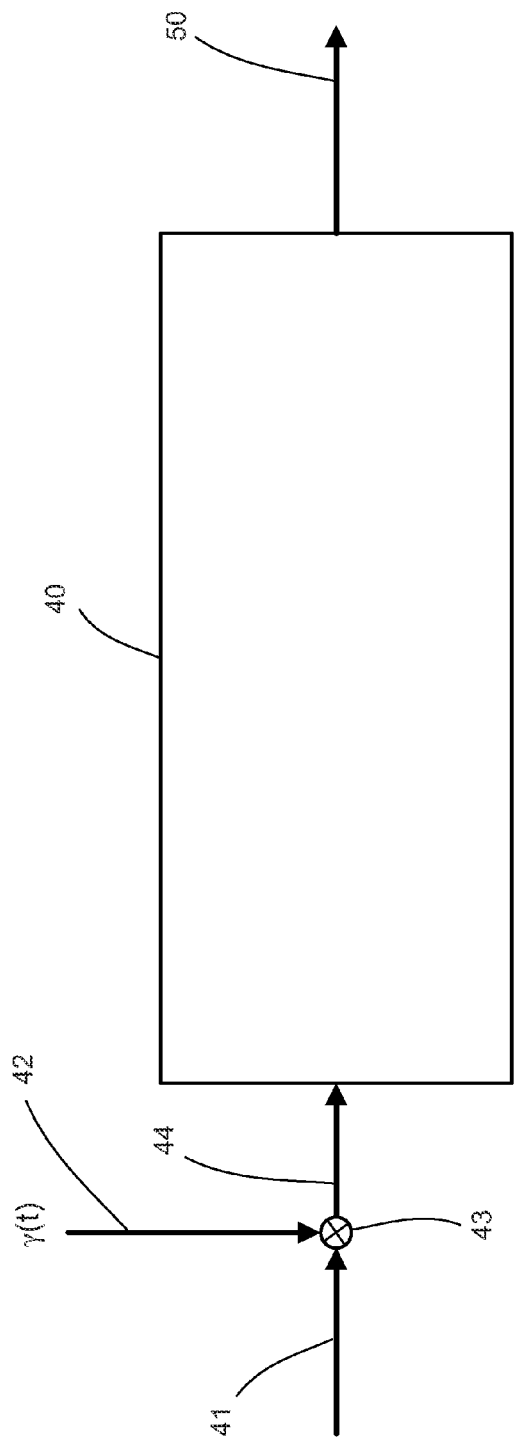

HARDWARE COUNTERMEASURE AGAINST CRYPTOGRAPHIC ATTACK

FIELD

The present application generally relates to security and, in particular, to a hardware countermeasure for improving resistance of a computing device to physical cryptographic attacks.

BACKGROUND

Physical cryptographic attacks exploit implementation-specific characteristics of a computing device to provide additional information that may be used to assist in obtaining the secret parameters used by the computing device in cryptographic operations.

Generally, physical cryptographic attacks may be categorized into three broad categories: invasive attacks, semi-invasive attacks and non-invasive attacks. Invasive attacks, such as de-packaging the computing device to allow for direct probing of device operations, may be resisted by constructing tamper-resistant hardware with sensors to detect the invasive attack. Semi-invasive attacks, such as using laser or ionized beams to induce faults in the device operations, may be resisted by including fault propagation in the circuits of the device to amplify the induced fault or by including consistency checking of results to detect and correct the induced faults. Non-invasive attacks typically use externally available physical measurements of the computing device while performing cryptographic operations to provide additional information that may be used to break an otherwise secure cryptographic operation.

Non-invasive attacks that are passive, ie pure measurement without interfering with device operations, are commonly known as "side-channel" attacks and pose particular challenges to computing device security. Side-channel attacks exploit the physical implementation of a cryptographic operation on a computing device, without taking any direct action on the operations of the computing device.

It would be advantageous to provide for a hardware countermeasure that improves the resistance of a computing device to cryptographic attack.

BRIEF DESCRIPTION OF THE DRAWINGS

Reference will now be made to the accompanying drawings which show embodiments of the present application, and in which:

FIG. 1A shows, a traditional cryptographic model involving secure communications between correspondents over a communication channel;

FIG. 1B shows, the cryptographic model of FIG. 1A including an eavesdropper or man-in-the-middle attack on the communication channel

FIGS. 2A and 2B illustrate prior art methods of generating noise using hardware.

FIGS. 4A, 4B and 4C illustrate embodiments of a noise-sample generator for the hardware countermeasure of FIG. 3.

Similar reference numerals may have been used in different figures to denote similar components.

DESCRIPTION OF EMBODIMENTS

Figure 1C:
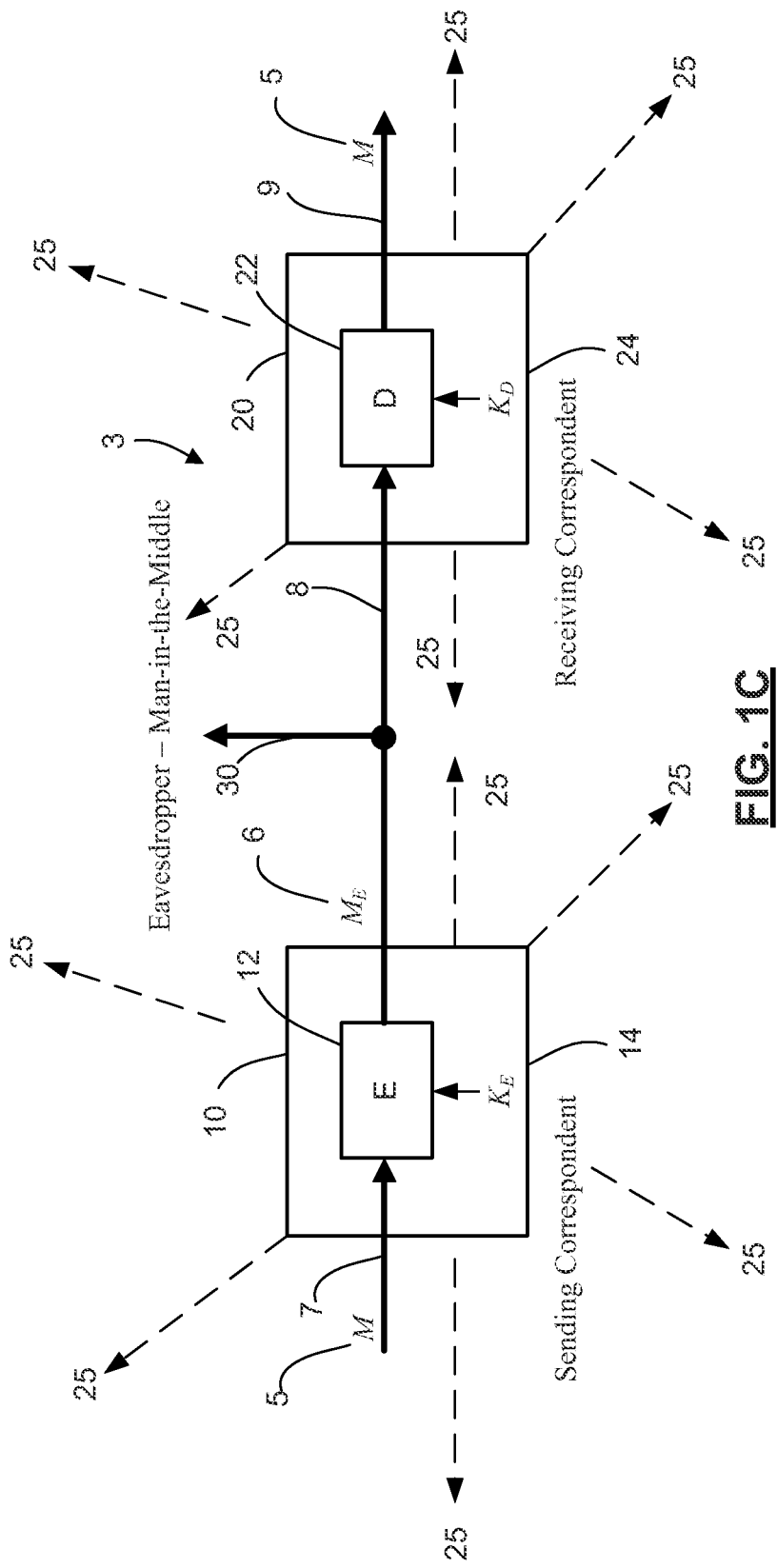
FIG. 1C shows, the cryptographic model of FIG. 1B including emanation of side-channel information from the correspondents.

In an embodiment, a hardware countermeasure for a cryptographic hardware module of a computing device is provided. The hardware countermeasure may comprise a noise-sample generator, wherein the noise-sample generator is operable to accept as input data samples to be processed by the cryptographic hardware module and to generate as output a noise-sample for each of the input data samples, and wherein the noise-sample associated with a power level; and a distributed buffer network co-located with the cryptographic module, wherein the distributed buffer network is operable to accept as input the noise-samples and to emit, for each of the noise-samples, a noise output proportional in power to the power level associated with that noise-sample.

In an aspect, the distributed buffer network may comprise a plurality of buffers, and wherein each of the plurality of buffers is connected with a corresponding capacitive load. At least one of the plurality of buffers and the corresponding capacitive load(s) may be located adjacent to an input register of the cryptographic hardware module. At least one of the plurality of buffers and the corresponding capacitive load(s) may be located adjacent to a hardware block of the cryptographic module that performs a masking operation. The masking operation may comprise either the application of a random mask to an input data sample for operation by a cryptographic operation or the removal of a random mask from an output data sample operated on by the cryptographic operation. In an aspect, at least one of the plurality of buffers and the corresponding capacitive load(s) may be located adjacent to a hardware block of the cryptographic module that performs a mask modification operation to update a mask of a masking operation.

In an aspect, the distributed buffer network may be constructed with a standard CMOS structure and co-located with at least one cryptographic logic hardware block of the cryptographic hardware module.

In an aspect, the noise-sample may comprise a binary number and each bit of the binary number corresponds to one or more buffers of the distributed buffer network. The distributed buffer network may be operable to emit the noise output by activating the one or more buffers that correspond to each bit of the binary number. The one or more buffers may comprise an increasing number of buffers corresponding to a significance of the each bit.

In an aspect, the noise-samples output by the noise-sample output generator may comprise non-Gaussian noise-samples.

In an aspect, the distributed buffer network may comprise a plurality of buffer blocks, each of the plurality of buffer blocks comprising at least one buffer, and the distributed buffer network is operable to emit the noise output by activating a combination of the plurality of buffer blocks corresponding to each of the noise-samples. Each of the plurality of buffer blocks may comprise a different number of buffers. Each of the plurality of buffer blocks may dissipate a different noise power level. The noise-sample may comprise a binary number and each bit of the binary number corresponds to a one of the plurality of buffer blocks.

Embodiments of the hardware countermeasure as described above may comprise part of a computing device. In an aspect, the computing device may comprise a mobile communications device.

FIG. 1A illustrates a traditional cryptographic model 2 involving secure communications between a sending correspondent 10 and a receiving correspondent 20 over a communication channel 8. In the model 2, a message M 5 is taken as input 7 by the sending correspondent 10. The sending correspondent 10 applies an encrypting cryptographic operation 12 that includes an encryption key $K_E$ 14 as a private (secret) value. The encrypted message $M_E$ 6 may be communicated securely over an open communication channel 8 to the receiving correspondent 20. The receiving correspondent 20 may apply a decrypting cryptographic operation 22 that includes a decryption key $K_D$ 24 to recover the M 5 as output 9.

FIG. 1B illustrates the traditional cryptographic model 2 of FIG. 1A, further including an eavesdropper 30 that may intercept the encrypted message $M_E$ 6 as it is transmitted over the communication channel 8. The potential success of an interception attack of this type may typically be predicted from the theoretical strength of the encrypting cryptographic operation 12 being employed.

FIG. 1C illustrates the model of FIG. 1B and further including side-channel information 25 that is physically emanating from the sending computing device 14 and the receiving computing device 24. Generally, for a cryptographic operation, the side-channel information 25 will be correlated to sub-steps of the cryptographic operation. An attacker may collect the side-channel information 25 and, in combination with an understanding of the underlying cryptographic process, may apply statistical methods to the side-channel information 25 to break the cryptographic process.

A common side-channel attack includes measuring the electric field generated by the computing device when values are stored in registers of the computing device. These measurements provide timing information, as well as providing some information regarding the size of a value and whether a value has changed between operations or for repeated calculations using the same input value.

One approach to resist such an attack has been to add random power dissipation to the computing device by executing arbitrary computations in parallel to the cryptographic operations. Referring to FIG. 2A, a cryptographic operation 26 may generate side-channel information. The side-channel information may be masked by a noise source, such as a Linear Feedback Shift Register (LFSR), that generates a random number each clock cycle. In FIG. 2A, a noise register 28 is connected to a pseudo-random number generator 29 that supplies a random number each clock cycle. The generated random number emanates its own signal, the power of which is determined by the size of the register 28 (ie the number of bits in the number) and the operation of the pseudo-random number generator 29, such as the switching of components like XOR gates.

An alternate approach to a noise additive circuit 30 is illustrated in FIG. 2B. In FIG. 2B, the noise additive circuit 30 comprises one or more dummy operations 36 that operate in parallel to the cryptographic operation 34. As illustrated, an input value 31 may be stored in a register 32 and delivered to both the cryptographic operations 34 and the dummy operations 36. Only the output 35 from the cryptographic operations 34 is passed on for further processing by the computing device. The dummy operations 36 are preferably unrelated to the input data 31 or any cryptographic keys used in the cryptographic operations 34, but may be physically close to the cryptographic operations 34. The one or more dummy operations 36, preferably generate random background noise, rather than a repetitive signal that may be filtered out by an attacker. The power of the noise signal is dependent upon a number of dummy operations 36 and a size of any numbers stored in registers that form part of the dummy operations 36.

A further approach (not shown) is to employ a ring oscillator whose output randomly oscillates between two voltage levels (e.g. TRUE and FALSE). A potential limitation of the ring oscillator is that the power dissipation is a related to the frequency of the oscillation. Effectively, where a ring oscillator is oscillating at the clock speed of the board, the power dissipation is a fixed value. The level of power can be increased by either increasing the number of ring oscillators, or increasing the oscillation frequency of the ring oscillator.

Generally, the above approaches all generate Additive White Gaussian Noise (AWGN). All processes being executed on a computing device generate a signal. An attacker can isolate the signal emitted by cryptographic operations by locating a capture antenna physically closest to the cryptographic operations, and/or by applying signal processing techniques to the captured signal to enhance the cryptographic signal and suppress the background or control operation signal. These signal processing techniques can typically be applied to suppress AWGN noise signals, for instance by collecting a number of sample measurements from the computing device. Over time, and a sufficient number of sample measurements, the AWGN signal will tend to average to a constant (positive value, negative value or zero) regardless of a number of sample measurements collected or a time of collection. For instance, for AWGN noise, an average $m_1$ for 1000 collected samples may have a value of c and an average $m_2$ for 2000 collected samples also has the value c.

AWGN sources are an imperfect solution for countering side channel analysis attacks, and require that the power dissipated be high enough to cover the underlying cryptographic operations. The above methods generally provide either a limited power dissipation level, and/or are not constructed of standard CMOS architecture.

Figure 3:
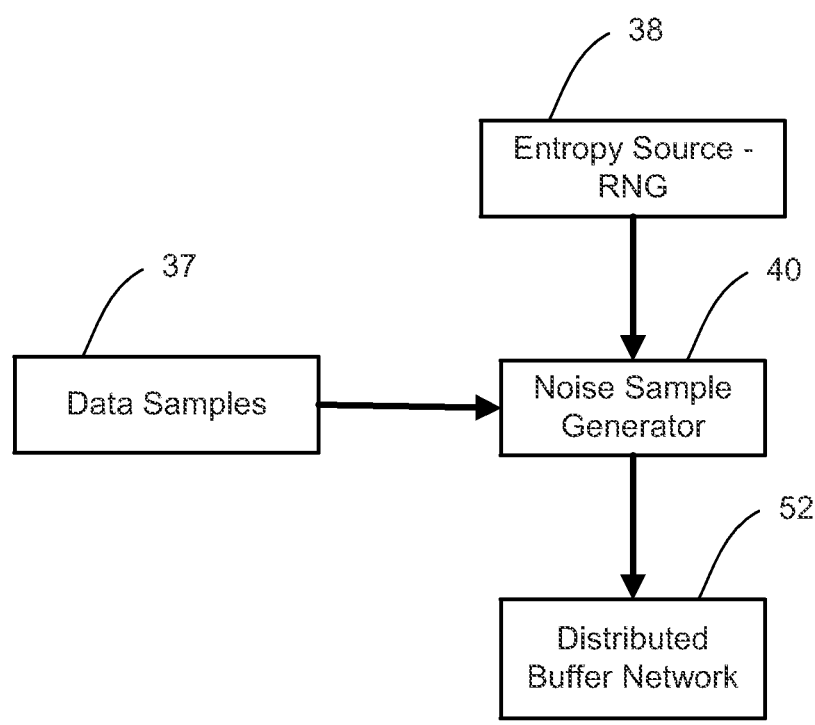
FIG. 3 illustrates an embodiment of a hardware countermeasure.

In an embodiment of a hardware implementation, referring to FIG. 3, a hardware countermeasure is provided that improves the resistance of a computing device, such as a hardware cryptographic module, to side channel attack. In the embodiment of FIG. 3, an entropy source 38, such as a pseudo-random number generator, generates random values.

The random values and data samples 37 to be processed by the cryptographic hardware module are input to a noise-sample generator 40. The noise-sample generator 40 accepts as input the random values, shown as being generated from an entropy source 38, and the data samples 37, and generates as output, a noise-sample for each input data sample. The noise-sample being associated with a power level of a noise output to be emitted by the hardware countermeasure.

In an aspect, the series of noise-samples may comprise non-Gaussian noise-samples. For non-AWGN signals, an average computed from collected samples will change over time, based on a number of measurements and a time of collecting the samples. For instance, for non-AWGN noise, an average $n_1$ for 1000 collected samples may have a value of $c_1$ and an average $n_2$ for 2000 collected samples has the value $c_2$, where $c_1 \mathrel{!}= c_2$. Typically, a magnitude of each of $c_1$ and $c_2$, are larger than a magnitude of c.

The noise-samples from the noise-sample generator 40 are used to drive a distributed buffer network 52 that generates a noise output proportional in emitted power to a power level associated with each input noise-sample. The entropy source 38 and noise-sample generator 40 may be physically located elsewhere on the computing device, but the distributed buffer network 52 is preferably co-located with the hardware cryptographic module and most preferably co-located with any sensitive operations to be performed by the hardware cryptographic module, such as a hardware masking or de-masking operation.

Referring to FIG. 4A, an embodiment of a noise-sample generator 40 for supplying noise-samples in an embodiment of a hardware countermeasure is illustrated. In the embodiment, a sample input 41, such as a data sample being input into a cryptographic module, is preferably masked 43 with a sample from a random data sequence γ(t) 42. The random data sequence γ(t) 42, may be generated from an entropy source 38, as illustrated in FIG. 3. The sample input 41 may comprise, for instance, a parallel output from an input register to the cryptographic module. The masking operation 43 may be considered to occur before (as illustrated) or as part of the noise-sample generator 40. The masked sample input 44 may then be operated upon by the noise-sample generator 40 to generate a noise-sample output 50. The noise-sample output 50 being associated with a noise output power level to be emitted by the hardware countermeasure. The noise-sample generator may comprise, for instance a digital filter having one or more coefficients.

Figure 4B:
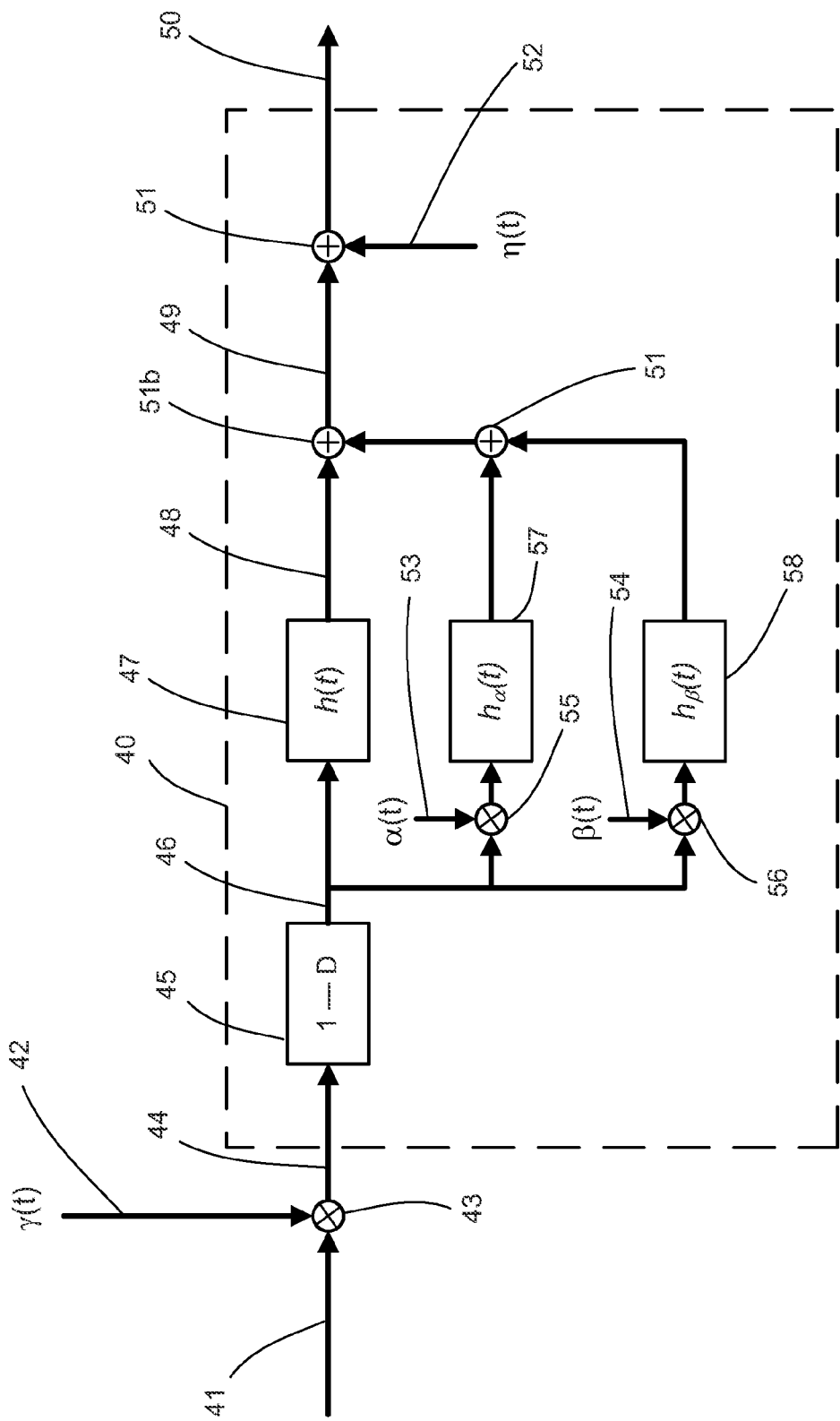

In the embodiment of FIG. 4B, the masked sample input 44 may first be operated on by a difference operation 45, generating a difference 46 between a current sample and previous sample. The difference operation 45 is optional in an embodiment of the noise-sample generator 40. The difference 46 may then be input into a filter operation h(t) 47 to generate a filtered sample 48. The filtered sample 48 may optionally be further operated on by a masking operation 51, shown as an additive masking operation in FIG. 4, by combination with a sample from a random data masking sequence η(t) 52.

The embodiment of FIG. 4B illustrates an optional arrangement, where the difference 46 may be further operated in parallel by a plurality of filter operations h(t) 47, $h_\alpha(t)$ 57 and $h_\beta(t)$ 58. In the embodiment of FIG. 4B, the difference 46 may be split between the plurality of filter operations h(t) 47, $h_\alpha(t)$ 57 and $h_\beta(t)$ 58, filtered and combined, for instance through an additive operation 51b, to generate a combined filtered sample 49 that may be masked in masking operation 51 with the random data masking sequence η(t) 52.

The difference 46 may be masked in a masking operation before input to one or more of the filter operations h(t) 47, $h_\alpha(t)$ 57 and $h_\beta(t)$ 58. In the embodiment illustrated in FIG. 4B, the difference 46 may be masked with filter masking operations 55, 56 before some of the plurality of filter operations $h_\alpha(t)$ 57 and $h_{\beta\beta}(t)$ 58 to avoid operating on the same input in each of the plurality of filter operations h(t) 47, $h_\alpha(t)$ 57 and $h_\beta(t)$ 58. In the embodiment illustrated in FIG. 4B, each of the filter masking operations 55, 56 comprise an XOR operation, combining the difference 46 with a sample from a random data sequence α(t) 53, β(t) 54.

The filter operations h(t) 47, $h_\alpha(t)$ 57 and $h_{\beta\beta}(t)$ 58 may comprise, for instance, a Finite Impulse Response (FIR) filter. The filter coefficients may differ between each of the filter operations h(t) 47, $h_\alpha(t)$ 57 and $h_\beta(t)$ 58 and in an aspect are selected randomly or pseudo-randomly. In an embodiment, the filter coefficients may further be re-set after one or more cryptographic operations or "execution traces" performed by the cryptographic module. In an aspect, the filter coefficients may be determined by at least one look-up table containing pseudo random data that has been selected for optimum filter operations according to known signal processing techniques. In the aspect, the filter coefficients may be updated by selecting either a next set of filter coefficients, or a random set of filter coefficients from the at least one look-up table. The selection may occur either after a pre-selected number of cryptographic operations, or according to some other trigger criteria, such as after a random number of operations or a period of time.

In an embodiment, for instance, the filters may employ a coefficient word length of about 6 bits and the filters may comprise $7^{th}$ order filters having 8 coefficients, though other combinations of word lengths and filter order are contemplated and may be selected depending upon the application and level of complexity required.

The outputs from the plurality of filter operations h(t) 47, $h_\alpha(t)$ 57 and $h_\beta(t)$ 58 may be combined, for instance through addition operations 51b to generate the combined filtered sample 49. The combined filtered sample 49 may be combined in a masking operation 51 with the sample from the random data masking sequence η(t) 52 to generate the noise-sample output 50.

Figure 4C:
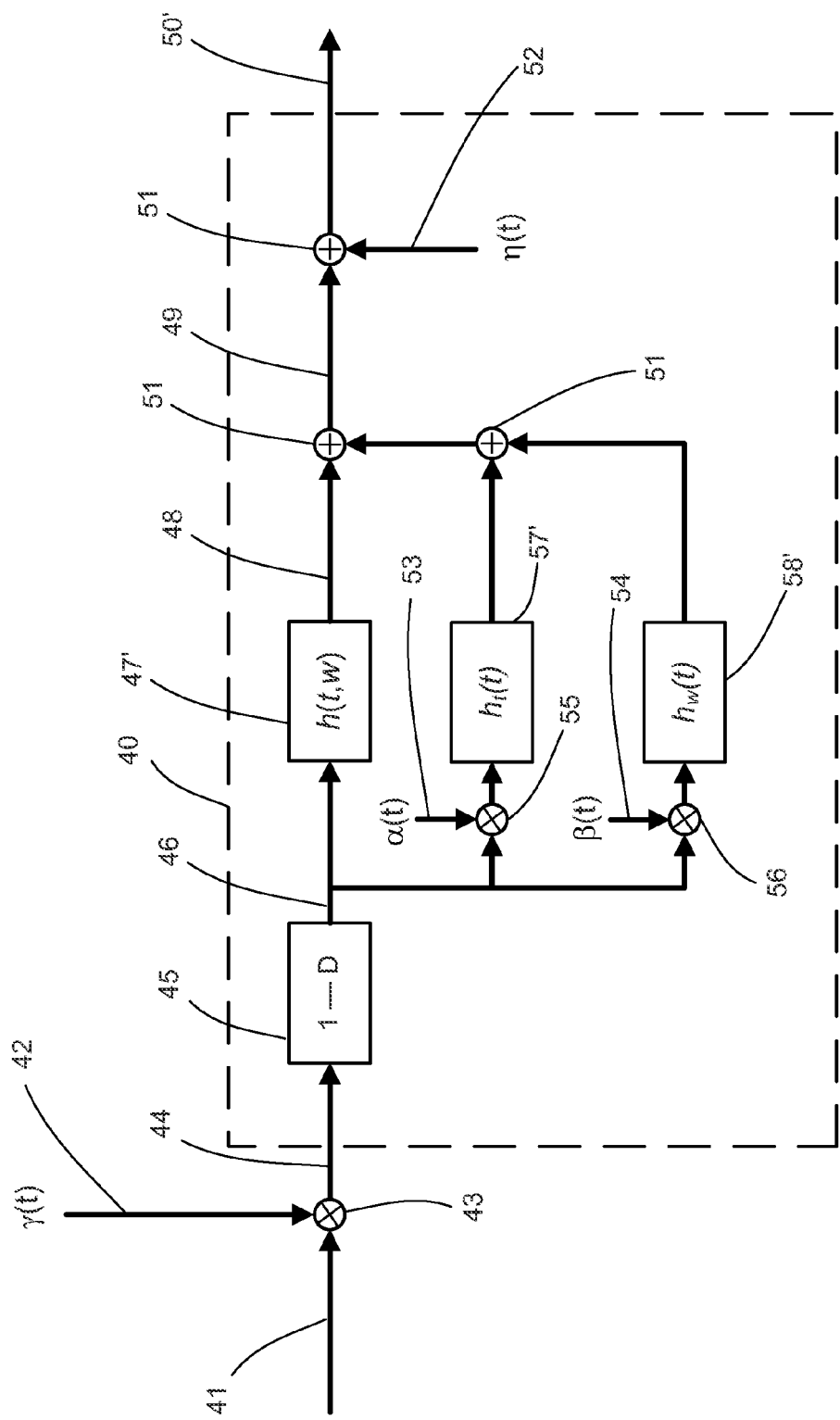

The embodiment of FIG. 4C illustrates an alternative optional arrangement, comprising three filter operations h(t, w) 47', $h_t(t)$ 57' the first order partial derivative of h(t,w) 47' with respect to t, and $h_w(t)$ 58' the first order partial derivative of h(t,w) 47' with respect to w. In the embodiment, the three filter operations h(t,w) 47', $h_t(t)$ 57', and $h_w(t)$ 58' generate a non-Gaussian noise-sample output 50'. While the noise-sample generator 40 accepts as input a sample input 41, the non-Gaussian noise-sample output 50' preferably is not correlated to the sample input 41.

The noise-sample output 50, or non-Gaussian noise-sample output 50', may comprise, for instance, a binary number that is received as input by a noise generation component such as a distributed buffer network 52. The distributed buffer network 52 may take as input the noise-sample output 50, or non-Gaussian noise-sample output 50', from the noise-sample generator 40 and dissipate a noise output having a power level that corresponds to a value of the input noise-sample 50 50'.

Figure 5A:
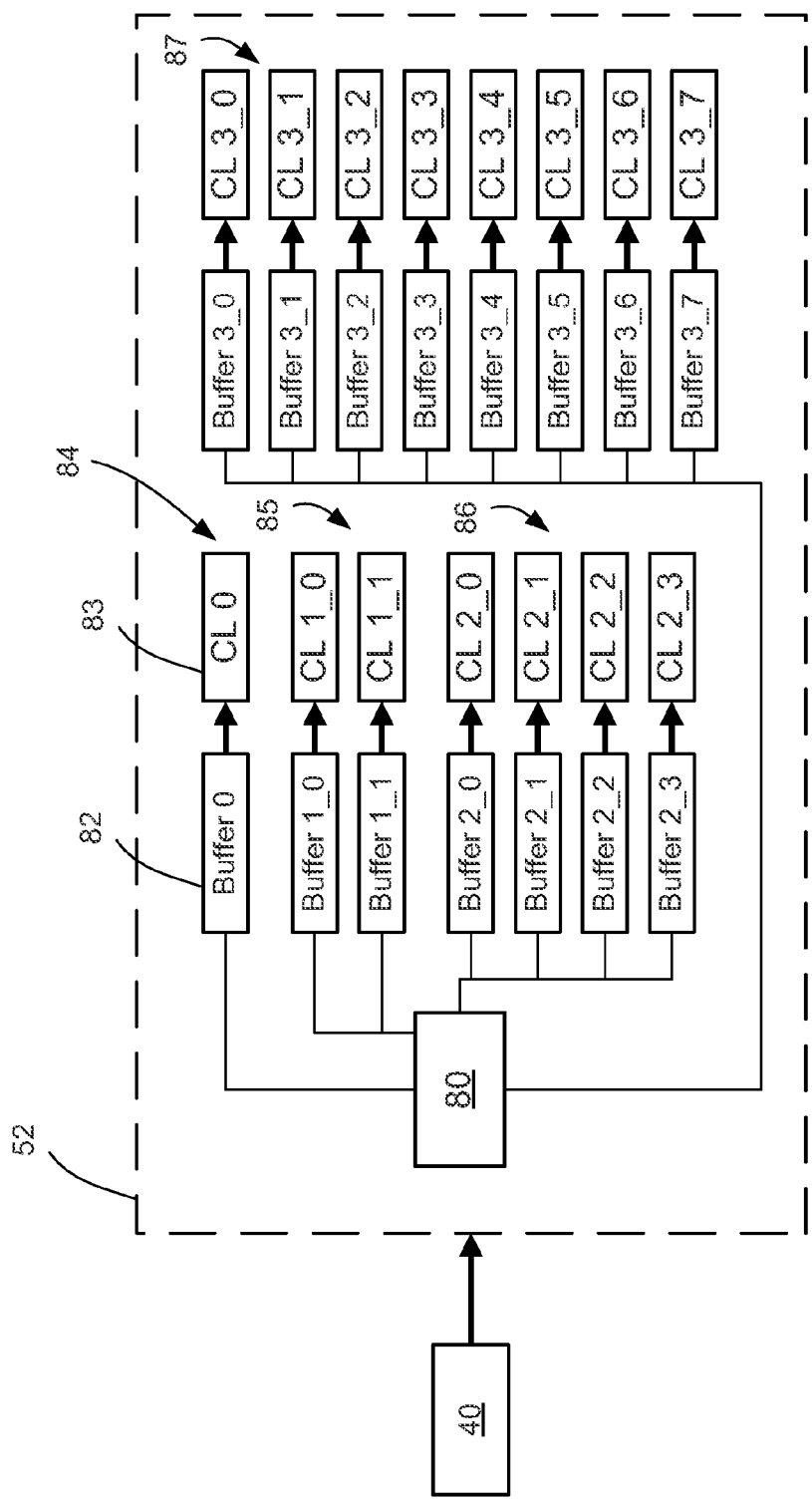
FIG. 5A illustrates an embodiment of a distributed buffer network.

Referring to FIG. 5A, in an embodiment, the noise-sample generator 40 may send noise-sample outputs to the distributed buffer network 52, which may comprise a plurality of buffers 82. Each of the plurality of buffers 82 may be connected with a corresponding capacitive load 83. For each of the plurality of buffers 82, the corresponding capacitive load 83 determined by a size of that buffer 82 and a required response time for the buffer 82 as dictated by a board speed of the hardware, as would be understood by a person skilled in the art. For each of the plurality of buffers 82, a combination of a buffer 82 connected with the corresponding capacitive load 83 may dissipate a noise output having a magnitude determined by a size of the buffer 82 and the corresponding capacitive load 83.

In the embodiment of FIG. 5A, control logic 80 is operable to activate some of the n buffer blocks 84, 85, 86, 87 in response to noise-samples received from the noise-sample generator 40. Generally, each noise-sample corresponds to a noise output power level to be output by the buffer network 52. Accordingly, each noise-sample corresponds to a number of buffers 82, or combination of buffer blocks 84, 85, 86, 87 to be activated by the distributed buffer network 52.

As illustrated in Table 1, by way of an embodiment below, the control logic 80 may activate different combinations of the buffer blocks 84, 85, 86 & 87, where the $i^{th}$ bit of the noise-sample value controls a one of the buffer blocks 84, 85, 86 & 87 generating a noise power proportional to $2^i$.

TABLE 1

| Noise-sample Value (0-15) | Binary Value | Buffers Activated | Power Level |
|---|---|---|---|
| 0 | 0000 | NULL | 0 |
| 1 | 0001 | 84 | $1 * P_{ref}$ |
| 2 | 0010 | 85 | $2 * P_{ref}$ |
| 3 | 0011 | 86 | $3 * P_{ref}$ |
| 4 | 0100 | 87 | $4 * P_{ref}$ |
| 5 | 0101 | 84, 85 | $5 * P_{ref}$ |
| 6 | 0110 | 84, 86 | $6 * P_{ref}$ |
| 7 | 0111 | 84, 87 | $7 * P_{ref}$ |
| 8 | 1000 | 85, 86 | $8 * P_{ref}$ |
| 9 | 1001 | 85, 87 | $9 * P_{ref}$ |
| 10 | 1010 | 86, 87 | $10 * P_{ref}$ |
| 11 | 1011 | 84, 85, 86 | $11 * P_{ref}$ |
| 12 | 1100 | 84, 85, 87 | $12 * P_{ref}$ |
| 13 | 1101 | 84, 86, 87 | $13 * P_{ref}$ |
| 14 | 1110 | 85, 86, 87 | $14 * P_{ref}$ |
| 15 | 1111 | 84, 85, 86, 87 | $15 * P_{ref}$ |

In the embodiment, each buffer 82 is assumed to be of a same buffer size. Accordingly, a noise power level dissipated by each buffer block 84, 85, 86 & 87 may be determined by multiplying a reference buffer power value $P_{ref}$ times a number of buffers 82 in that buffer block 84, 85, 86, 87. In an alternate embodiment, for instance, one or more of the buffers 82 may comprise buffers 82 of a different size, such that a buffer noise power level may vary according to a size of the one or more buffers 82. As will be appreciated, a power of the buffer blocks 84, 85, 86, 87 controlled by each bit of the noise-sample value is illustrated as an embodiment, and other combinations of bits and buffer blocks 84, 85, 86, 87 for emitting noise are contemplated.

The combinations illustrated in Table 1 provide different noise power levels, as well as differing locations of noise generation from the distributed buffer network 52. In the embodiment shown in FIG. 5A and Table 1, four buffer blocks 84, 85, 86, 87 may be activated by the control logic 80 in 16 different combinations illustrated in Table 1. While the embodiment shows n=4 buffer blocks 84, 85, 86, 87 as each including 2" buffers 82, in other embodiments the buffer blocks may include different numbers of buffers 82, including possibly some buffer blocks 84, 85, 86, 87 having a same number of buffers 82.

Figure 5B:
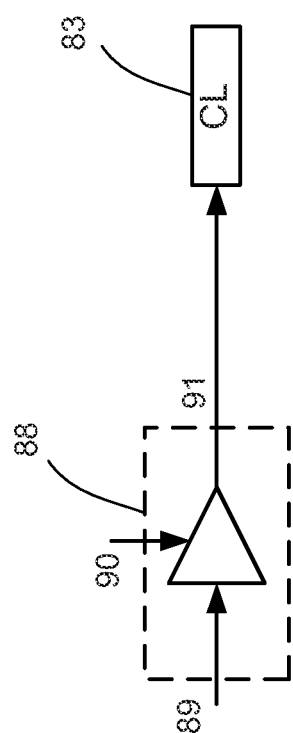
FIG. 5B illustrates an embodiment of a noise buffer.

Referring to FIG. 5B, in an embodiment, a buffer may comprise a tri-state buffer 88. The tri-state buffer 88 accepts as input the noise-sample, or a corresponding bit of the noise-sample for that tri-state buffer 88, through a control input 90. The tri-state buffer 88 further comprises an enabling input 89 that may, for instance, take as input a timing signal to trigger activation of the tri-state buffer 88. The timing signal may comprise, for instance, a clock signal clocked to the operations of the hardware module 60. The clock signal enable the tri-state buffer 88 to activate at the same clock timing as the hardware operations to be masked by the distributed buffer network 52. In an aspect, the clock signal may specifically comprise a local clock signal connected to hardware components adjacent to a corresponding buffer network 52.

Figure 6:
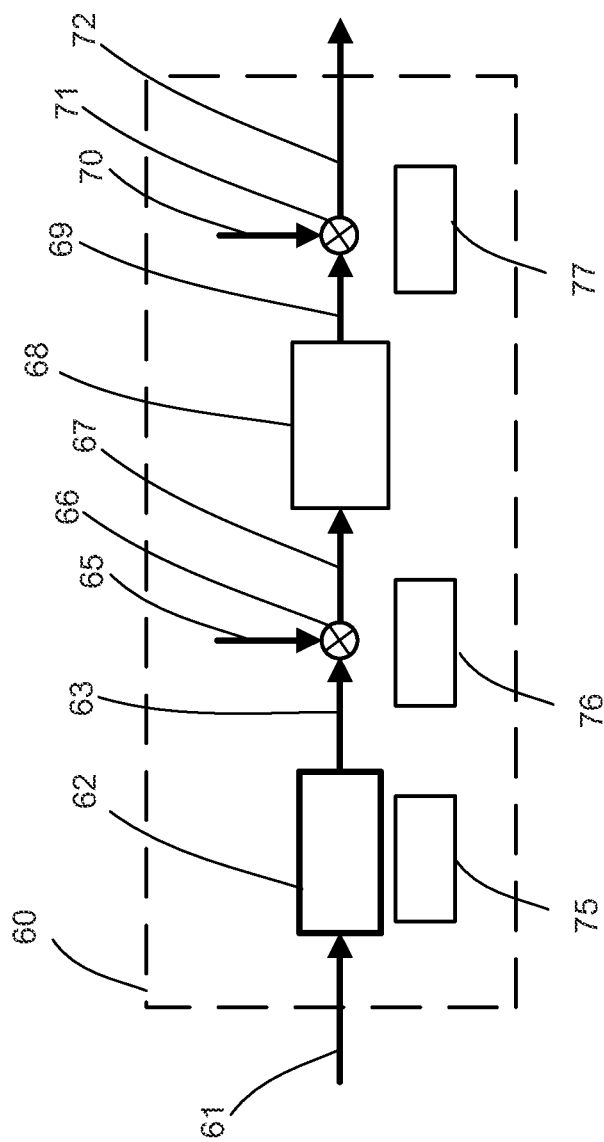
FIG. 6 illustrates an embodiment of a hardware countermeasure for a cryptographic hardware module.

Referring to FIG. 6, a hardware module 60, such as a cryptographic hardware module, or a portion of a general hardware module that has been dedicated to secure operations such as cryptographic operations is illustrated.

An input 61 to the hardware module 60 may comprise input data to be processed by the hardware module 60. The input 61 may optionally be transferred to an input register 62 for temporary storage before the stored input 63 is operated on by an input cryptographic operation 66, such as the masking operation illustrated in FIG. 6. An input mask 65 is shown as being applied during the input cryptographic operation 66, which produces a masked input 67 that may be operated on by masked cryptographic operations 68. A masked result 69 of the masked cryptographic operations 68 may be operated on by an output cryptographic operation 71, such as the de-masking operation illustrated in FIG. 6. An output mask 70 is shown as being applied during the output cryptographic operation 71, which produces the unmasked result 72 for transfer out of the hardware module 60.

As illustrated in FIG. 6, in an aspect at least one of the plurality of buffers 75, and the corresponding capacitive load, may be located adjacent to a register within the cryptographic module, such as the input register 62 of the hardware module 60. In an embodiment, at least one of the plurality of buffers, and the corresponding capacitive load, may be co-located with internal registers, not shown in FIG. 6, of the cryptographic module that receive input data samples that are to be operated on by the cryptographic module.

For instance, in an encryption operation sensitive data is input into the cryptographic hardware module and, typically, stored in an input register 62 such as a sensitive data input register. The sensitive data input register 62 supplies the input sample for an initial cryptographic operation 66, such as a masking operation. Since the sensitive data input may typically have been output from another component of the computing device to the sensitive data input register 62 of the cryptographic module 60, it is possible for an attacker to localize and match the sensitive data input located in the other component with the sensitive data input located in the sensitive data input register 62. In the embodiment described above, at least one of the plurality of buffers 75, and the corresponding capacitive load, may be co-located with the sensitive data input register 62 such that the countermeasure is operable to protect values stored in the sensitive data input register 62 from side channel analysis. In an aspect, a plurality of buffers 75 from the distributed buffer network 75 may be co-located with the sensitive data input register 62.

Similarly, other data samples input to the hardware module 60 from the computing device, including data samples such as encrypted data, date/time, random data, etc., may be protected. In an embodiment, other registers within the hardware module 60 may be required to receive the input data for operation on by the hardware module 60.

Referring again to FIG. 6, in an embodiment, at least one of the plurality of buffers 76, and the corresponding capacitive load, may be located adjacent to a hardware block of the hardware module 60 that performs a cryptographic operation 66, such as the masking operation illustrated. For instance, the sensitive data input register 62 may supply an input value for operation in a masked cryptographic operation of the hardware module 60. An initial cryptographic operation 66 may consist of masking the input value in order to execute the masked cryptographic operation. In the embodiment, at least one of the plurality of buffers 76, and the corresponding capacitive load(s), may be located adjacent to the hardware components that perform the cryptographic operation 66. Once the input data has been masked, a risk of side channel analysis being successful is greatly reduced, so co-locating the at least one of the plurality of buffers 76 with the cryptographic operation 66 allows for a minimum of power expenditure in countering the side channel analysis.

Referring again to FIG. 6, in an aspect, at least one of the plurality of buffers 77, and the corresponding capacitive load, may be located adjacent to a hardware block of the hardware module 60 that performs a subsequent cryptographic operation 71, such as the de-masking operation illustrated. The subsequent cryptographic operation 71 may consist of the removal of a random mask from an output data sample 69 operated on by the masked cryptographic operation 68. For instance, after execution of the masked cryptographic operation 68, the hardware module 60 may remove the mask by applying a de-masking mask 70 in the subsequent cryptographic operation 71 to yield an unmasked result 72 of the masked cryptographic operation 68 (such as encrypted or decrypted data) for output from the hardware module 60 to the computing device. Co-locating the at least one of the plurality of buffers 77 with the de-masking operation protects against providing information about the mask that was used in the masked cryptographic operation 68.

In an embodiment, the at least one of the plurality of buffers and the corresponding capacitive load may be located adjacent to a mask modification hardware block of a hardware module 60 that performs a mask modification operation to update a mask of a masking operation. Co-locating the at least one of the plurality of buffers with the mask modification operation protects against providing information about the mask that was used in the masked cryptographic operation. The mask modification hardware block may in an aspect be located, for instance, proximate to the cryptographic operation 66, shown as a masking operation, or the subsequent cryptographic operation 71, shown as a de-masking operation. In an alternate aspect, the mask modification hardware block may be located at another location within the hardware module 60.

In an embodiment, the distributed buffer network may be built with a standard CMOS structure. Accordingly, the buffers and corresponding capacitive load may be formed using the same silicon process as the rest of the cryptographic hardware module and co-located with either data registers, or cryptographic logic hardware blocks of the cryptographic hardware module. For instance, a register block within the cryptographic hardware module may start with register bits that contain a data sample, and end with register bits that comprise one or more of the buffers of a distributed buffer network. The one or more of the buffers of the distributed buffer network may each be located adjacent to a corresponding capacitive load. Constructing the distributed buffer network with a standard CMOS structure may reduce cost, reduce the size of a cryptographic hardware module containing the hardware countermeasure and improve its resistance to side channel analysis.

In an embodiment, the noise-sample generated by the noise-sample generator 40 may comprise a binary number. In an aspect, each bit of the binary number may control one or more buffers of the distributed buffer network. Accordingly, a power level of noise generated by the distributed buffer network may not increase linearly with a number of bits contained in each noise-sample. In an aspect, the bits may cause activation of the one or more buffers that correspond to that bit of the noise-sample.

Certain adaptations and modifications of the described embodiments can be made. Therefore, the above discussed embodiments are considered to be illustrative and not restrictive.

What is claimed is:

1. A hardware countermeasure for a cryptographic hardware module of a computing device, the hardware countermeasure comprising:
   a non-Gaussian noise-sample generator, wherein the noise-sample generator is operable to accept as input data samples to be processed by the cryptographic hardware module and to generate as output a non-Gaussian noise-sample for each of the input data samples, and wherein the non-Gaussian noise-sample is a binary number associated with a power level that corresponds to one or more buffers of the distributed buffer network; and,
   a distributed buffer network co-located with the cryptographic module, wherein the distributed buffer network is operable to accept as input the non-Gaussian noise-samples and to emit, for each of the noise-samples, a noise output power proportional to the power level associated with that noise-sample by activating, for each bit of the binary number, one or more buffers corresponding to a significance of that $i^{th}$ bit, such that the activated one or more buffers emit a noise power proportional to $2^i$.

2. The hardware countermeasure of claim 1 wherein the distributed buffer network comprises a plurality of buffers, and wherein each of the plurality of buffers is connected with a corresponding capacitive load.

3. The hardware countermeasure of claim 2 wherein at least one of the plurality of buffers and the corresponding capacitive load(s) are located adjacent to an input register of the cryptographic hardware module.

4. The hardware countermeasure of claim 2 wherein at least one of the plurality of buffers and the corresponding capacitive load(s) are located adjacent to a hardware block of the cryptographic module that performs a masking operation.

5. The hardware countermeasure of claim 4 wherein the masking operation comprises either the application of a random mask to an input data sample for operation by a cryptographic operation or the removal of a random mask from an output data sample operated on by the cryptographic operation.

6. The hardware countermeasure of claim 2 wherein at least one of the plurality of buffers and the corresponding capacitive load(s) are located adjacent to a hardware block of the cryptographic module that performs a mask modification operation to update a mask of a masking operation.

7. The hardware countermeasure of claim 1 wherein the distributed buffer network is built with a standard CMOS structure and co-located with at least one cryptographic logic hardware block of the cryptographic hardware module.

8. The hardware countermeasure of claim 1 wherein the distributed buffer network comprises a plurality of buffer blocks, wherein each of the plurality of buffer blocks comprises at least one buffer, and wherein the distributed buffer network is operable to emit the noise output by activating a combination of the plurality of buffer blocks corresponding to the each of the noise-samples.

9. The hardware countermeasure of claim 8 wherein each of the plurality of buffer blocks comprises a different number of buffers.

10. The hardware countermeasure of claim 8 wherein each of the plurality of buffer blocks dissipates a different noise power level.

11. The hardware countermeasure of claim 8 wherein each bit of the binary number corresponds to a one of the plurality of buffer blocks.

12. A mobile communications device comprising the hardware countermeasure of claim 1.

* * * * *